United States Patent [19]

Jönsson

[11] 4,186,475
[45] Feb. 5, 1980

[54] METHOD AND MEANS FOR RAPID REPLACEMENT OF DAMAGED PIPE SECTIONS

[75] Inventor: Arne Jönsson, Torshälla, Sweden

[73] Assignee: NYBY Bruk AB, Sweden

[21] Appl. No.: 738,900

[22] Filed: Nov. 4, 1976

Related U.S. Application Data

[62] Division of Ser. No. 427125, Dec. 21, 1973, abandoned.

[30] Foreign Application Priority Data

Dec. 22, 1972 [DE]  Fed. Rep. of Germany ........ 2263002

[51] Int. Cl.² .............................................. B23P 7/00
[52] U.S. Cl. ..................................... 138/97; 137/15;
138/118; 29/446; 29/402.12; 285/2; 285/31;
285/15; 285/223; 285/225
[58] Field of Search ............. 29/401 R, 401 C, 401 D,
29/401 E, 401 F, 446; 137/15, 356; 285/31, 32,
226, 229, 223, 15, 356, 369, 353, 351, 235, 236;
138/103, 178, DIG. 8, DIG. 11, 119, 118, 97

[56] References Cited

U.S. PATENT DOCUMENTS

| 398,526 | 2/1889 | McCloskey | 285/223 |
|---|---|---|---|
| 1,997,845 | 4/1935 | Adams | 285/223 |
| 2,068,876 | 1/1937 | Snyder, Jr. | 285/223 |
| 2,543,954 | 3/1951 | Barber | 138/97 |
| 2,595,705 | 5/1952 | Rosecranz, Sr. | 285/31 |
| 2,673,100 | 3/1954 | Shumaker | 285/31 |
| 3,488,072 | 1/1970 | Allen et al. | 285/353 |
| 3,552,781 | 1/1971 | Helland | 285/356 X |
| 3,837,685 | 9/1974 | Miller | 138/97 |
| 3,865,410 | 2/1975 | Chen | 285/31 |

FOREIGN PATENT DOCUMENTS

| 497239 | 11/1950 | Belgium | 285/236 |
|---|---|---|---|
| 786263 | 6/1935 | France | 285/226 |
| 1128607 | 8/1956 | France | 285/31 |
| 583865 | 10/1958 | Italy | 285/31 |
| 137086 | 12/1919 | United Kingdom | 285/356 |
| 518754 | 3/1940 | United Kingdom | 285/226 |
| 626968 | 7/1949 | United Kingdom | 285/351 |

Primary Examiner—C. W. Lanham
Assistant Examiner—V. K. Rising
Attorney, Agent, or Firm—Craig and Antonelli

[57] ABSTRACT

Method and means of rapidly repairing damaged portions of conduits and pipes which are difficult or impossible to weld, whereby in the vicinity of the pipes to be maintained prepared replacement pipe sections are stored each together with two associated quick-action unions which comprise an annular coupling body bridging the pipe ends to be joined and having at least one threaded portion and a sealing insert which may be compressed by means of plugs adapted to be screwed into the threaded portion, and after cutting out a portion of the pipe which includes the damaged area and the length of which corresponds substantially to the length of the prepared replacement pipe section the latter is inserted into the pipe line and sealed by tightening and quick-action unions.

1 Claim, 6 Drawing Figures

METHOD AND MEANS FOR RAPID REPLACEMENT OF DAMAGED PIPE SECTIONS

This case is a division of Ser. No. 427,125, filed Dec. 21, 1973, and now abandoned.

The invention relates to a method and means for rapid replacement of damaged pipe sections, in particular damaged pipe sections of oil pipes, for example in ships, and distant-heating, water, gas or similar supply pipes, in particular of large diameter.

The method and means according to the invention are intended mainly for repair work and/or applications where it is extremely difficult to provide pipe ends with threads or to weld them, which is for example the case in tankers where pipes are laid along the walls or welding cannot be carried out because of the danger of fire. The invention is also very useful in all cases where personnel trained in making-up pipe connections is not available. Ships, particularly tankers, are again mentioned as examples, in which for example when collisions or other accidents occur pipe connections must be established extremely rapidly.

The problem underlying the invention is to provide a method and means which permit damage to pipes to be repaired as rapidly as possible without requiring welding or a similar lengthy procedure involving the danger of fire and explosion.

According to the invention this problem is solved in that in the vicinity of pipes to be maintained prepared replacement pipe sections are stored each together with two adapted quick-action unions which each comprise a tubular coupling body bridging the pipe ends to be joined and having a threaded portion at least at one end and at least one resiliently deformable sealing insert which may be compressed by means of plugs adapted to be screwed into the threaded portion of the coupling body.

The method according to the invention has the advantage that the storing of such prepared replacement pipe sections in the vicinity of the conduits or pipes to be maintained makes it possible to replace very rapidly any portion of the pipe which may be damaged by fracture or by any accidents. For this purpose, a portion of the pipe including the damaged area and having a length which corresponds as accurately as possible to the prepared replacement pipe section available is cut out of the pipe and the replacement pipe section provided with two quick-action unions inserted into the pipe and sealed by tightening the unions.

In joining pipes without welding the nature of the union at the abutting pipe ends is of decisive importance. The requirements made of such a union are primarily a simple construction, easy application and removal, a perfect seal, high resistance to corrosion and adequate strength.

A further object of the present invention is thus to provide a union which may be rapidly fitted and rapidly removed, is of simple structure but the design of which nevertheless meets the hardest requirements.

The union according to the invention is formed by a tubular coupling body which bridges the tube ends to be joined and comprises a thread cut at its one end and comprises at the other end a stop projecting into the interior of the coupling body, by a tubular insert of resiliently deformable material which is adapted to be inserted into the coupling body and the pipe ends and matches the bore of the coupling body and has a length which reaches from the stop to the start of the thread, by a rigid intermediate ring bearing on the resilient insert and by a threaded plug adapted to be screwed into the thread of the coupling body.

According to the invention the stop in the coupling body may be formed by a second plug which is adapted to be screwed into said body.

It has been found particularly advantageous to divide the resiliently deformable insert into two parts between which a rigid ring is interposed which is preferably so dimensioned that it bridges the abutting ends of the pipes to be joined. The rigid intermediate ring preferably has the same diameter dimensions as the resilient insert. The rigid intermediate ring may also be fixedly connected to the coupling body or made integral therewith when two plugs are provided. It may also be advantageous to divide the insert into more than two parts and correspondingly provide a plurality of rigid intermediate rings, thus making uniform the pressure exerted on the individual regions of the insert in the axial direction by the plug or plugs. Of course, in the case where only one plug is present the intermediate rings must all be loose, i.e. axially displaceable, and in the case where two plugs are provided the center intermediate ring may be fixedly connected to the coupling body.

The prepared replacement pipe sections preferably comprise two substantially rectilinear end portions whose center axes are in alignment and between said end portions a loop-shaped, U-shaped or lyre-shaped intermediate portion.

According to the invention, the loop-shaped pipe bends of the intermediate portion comprise arcs curved in opposite directions whose arrangement and radii of curvature are so chosen that on resilient compression of the replacement pipe section by forces acting in the direction of the center axis of the end portions on the latter said end portions remain in alignment with each other.

The invention will be explained in detail hereinafter with the aid of the examples of embodiment illustrated in the drawings, wherein.

Figure 1:
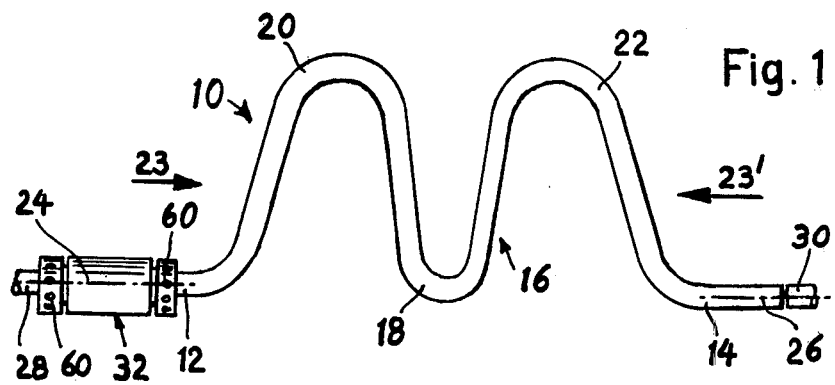
FIG. 1 shows a replacement pipe section according to the invention in side elevation in the assembled state, the quick-action union being removed on one side and the pipe being only partially indicated.
Figure 5:
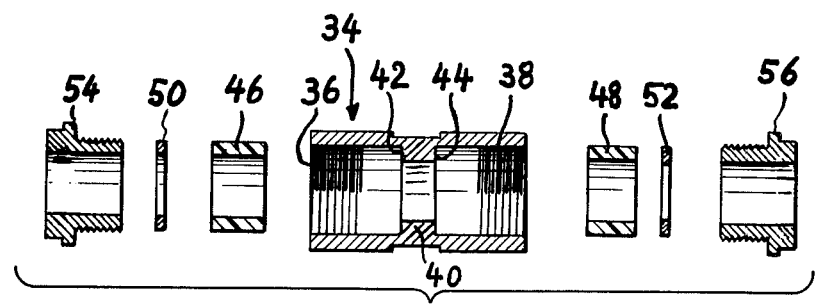
FIG. 5 is an exploded sectional view of a quick-action union made according to the invention and FIG. 6 shows a modified embodiment of the union according to FIG. 5.

The replacement pipe section 10 according to FIG. 1 comprises two substantially straight end portions 12, 14 and an intermediate portion 16 which is disposed between said end portions and comprises a relatively sharp, i.e. a relatively highly curved, center arc 18 and two less highly curved outer arcs 20, 22. As a result of the different curvature of the arcs 18, 20 and 22 it is achieved that the replacement pipe section 10 is resiliently compressible in the direction of the arrows 23, 23' without the aligned pipe center axes 24 and 26 of the end portions 12 and 14 appreciably coming out of alignment and consequently when the replacement pipe section 10 is resiliently compressed the pipe center axes 24 and 26 of the end portions 12 and 14 substantially retain their direction and do not distort with respect to the center axis of the adjacent end portions 28 and 30 of the pipe to be repaired. Of the two quick-action unions associated with the replacement pipe section 10, only the left one is illustrated in FIG. 1, being denoted by the reference numeral 32. As illustrated in detail in FIG. 5 this union comprises a tubular coupling body 34 which has at its ends two threaded portions 36 and 38 and the center region of which comprises a portion 40 of reduced diameter. The portion 40 forms annular bearing surfaces 42, 44 for two resilient inserts 46, 48 which may be introduced from both sides into the coupling body 34 and are resiliently deformable with interposition of preferably steel washers 50 and 52 by means of stoppers or plugs 54 and 56 to obtain a sealing.

Figure 2:
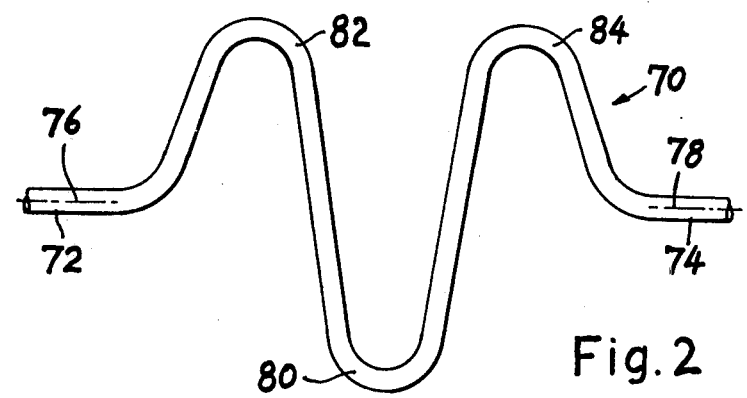
FIG. 2 shows a modified form of the pipe section according to the invention in side elevation.

FIG. 2 shows a replacement pipe section 70 comprising two substantially straight end portions 72 and 74 whose center axes 76 and 78 are in alignment. The curvatures of the arcs 80, 82 and 84 are made substantially equal but the center arc 80 extends beyond the line joining the pipe center axes 76 and 77 downwardly substantially the same amount as the arc portions 82, 84 extend upwardly beyond said connecting line. With the replacement pipe section 70 according to FIG. 2, when resiliently compressed in the direction of their center axes 76, 78 the end portions 72, 74 remain substantially in alignment.

Figure 3:
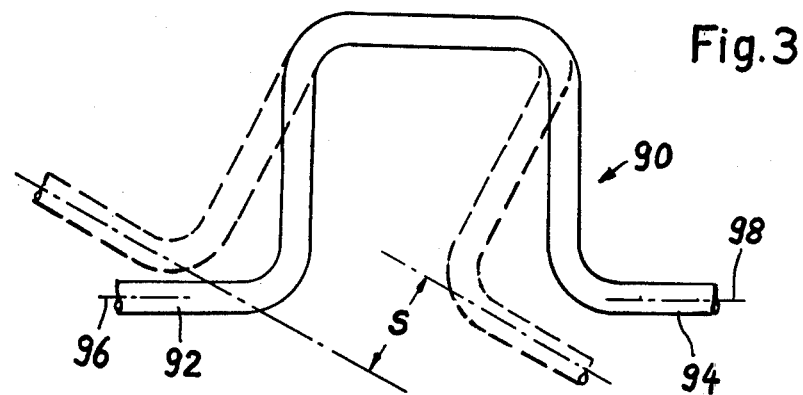
FIG. 3 is a further modified embodiment of the pipe section according to the invention in side elevation.

FIG. 3 shows a U-shaped replacement pipe section 90. This replacement pipe section 90 comprises two end portions 92, 94 whose center axes 96, 98 are in alignment with each other in the condition illustrated in continuous lines. This pipe section 90 is particularly advantageous when, after the defect pipe section has been removed, the pipe ends of the conduit to be repaired are no longer in alignment but are offset parallel to each other, which can occur when the fracture in the conduit has been caused by lateral forces acting thereon and producing high stresses therein. In this case the pipe ends 92, 94 can be brought by plastic deformation into the form shown in dashed line in FIG. 3, offset an amount denoted by S in FIG. 3.

Figure 4:
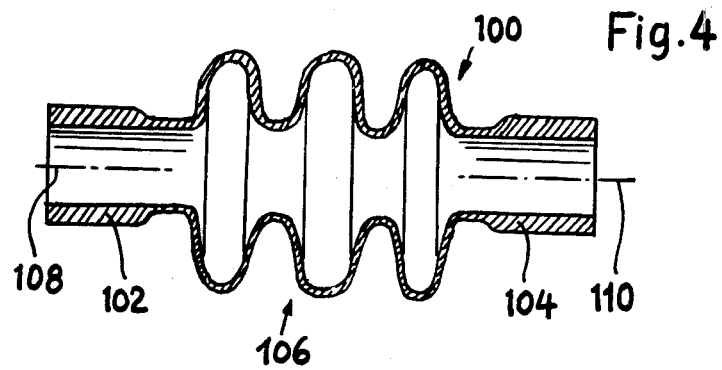
FIG. 4 is a longitudinal section of a modified form of the pipe section.

FIG. 4 shows a further embodiment of the replacement pipe section denoted generally by the reference numeral 100. This replacement pipe section comprises two thick-walled straight end portions 102 and 104 and an intermediate portion denoted generally by 106 and constructed as corrugated pipe. This corrugated intermediate section 106 has thinner walls than the end portions 102 and 104 on which the quick-action unions are arranged. The corrugated portion 106 permits elastic compression of the replacement pipe section 100 in the direction of the center axes 108 and 110 of the end portions 102 and 104 without said end portions coming out of alignment.

Figure 6:
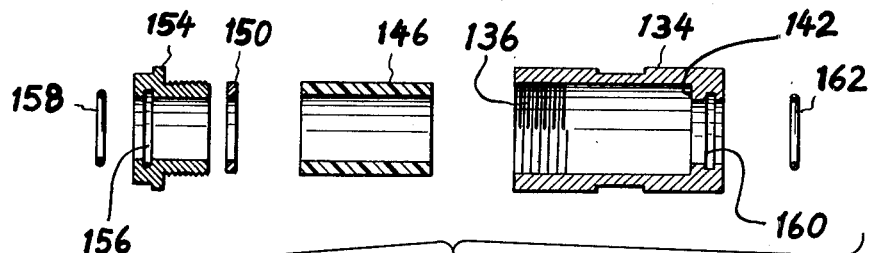

FIG. 6 shows a modified embodiment of the quick-action coupling; the coupling body 134 comprises a threaded portion 136 on only one side. The other end of the body 134 has a reduced internal diameter which forms a stop 142 for a resiliently deformable sealing insert 146. Said resiliently deformable insert 146 may be compressed via a washer 150 by means of a threaded plug 154. Cut internally in the threaded plug 154 is an annular groove 156 for an O-ring 158 which serves as additional seal. Analogously, an annular groove 160 for a further O-ring seal 162 is cut into the coupling body 134. The quick-action union 134 has the advantage that only one plug need be screwed in. This union is thus of simpler construction. It does not however comprise a constricted center portion which in the case of the union 34 illustrated in FIG. 5 bridges the joint between the two pipe ends to be connected and simultaneously effects adjustment of said ends.

The plugs 54, 56 and 154 are provided at their periphery with holes 60 for applying tools for screwing the plugs in and out.

One example of the application of the invention will now be described.

In a tanker a pipe leading to a machine with essential functions has burst. After turning of the flow in the pipe a section of the pipe having a length of 2 meters and containing the fracture is cut out. A quick-action union according to the invention is placed over each of the cut pipe ends. A replacement pipe section also having a length of 2 meters was then placed in the gap in the pipe and the unions pushed over the abutting ends and tightened and sealed by screwing in the plugs. Only a few minutes were needed to carry out the repair and it was then possible to switch the flow in the pipe on again.

The example is intended to explain the invention and is not a limitation of the scope thereof.

In the drawings and in the specification, there have been set forth preferred embodiments of the invention and, although specific terms are employed, they are used in a generic and descriptive sense only and not for purposes of limitation, the scope of the invention being defined in the claims.

What we claim is:

1. A method for rapidly repairing damaged portions of conduits and pipes which are difficult or impossible to weld, such as oil pipes, in particular on oil tankers, and long-distance heating pipes, water, gas or similar supply pipes, in particular of large diameter, said method comprising storing replacement pipe sections in the vicinity of the pipe to be repaired, each replacement pipe section having two substantially straight end portions and a generally U-shaped intermediate section formed by a plurality of substantially right-angular bends, and the method further comprising:

cutting out the damaged portion of a pipe to be repaired such that the pipe ends so formed are offset parallel to each other, plastically deforming two interior bends of said U-shaped intermediate segment by equal angular amounts in the same direction so that facing legs of said U-shaped segment remain parallel until the two straight end portions are offset parallel to each other by an amount equal to that of the pipe ends of the damaged pipe, inserting the plastically deformed replacement pipe section between the pipe ends of the damaged pipe, and establishing a sealed connection between said straight end portions and the pipe ends of the damaged pipe by quick-connect coupling unions.

* * * * *